United States Patent
Ohtomo et al.

(10) Patent No.: US 9,541,382 B2
(45) Date of Patent: Jan. 10, 2017

(54) ROTATION ANGLE DETECTING APPARATUS AND SURVEYING INSTRUMENT

(71) Applicant: Kabushiki Kaisha TOPCON, Itabashi-ku, Tokyo-to (JP)

(72) Inventors: Fumio Ohtomo, Asaka (JP); Kaoru Kumagai, Tokyo-to (JP); Tetsuji Anai, Tokyo-to (JP); Kazuki Osaragi, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 778 days.

(21) Appl. No.: 13/718,380

(22) Filed: Dec. 18, 2012

(65) Prior Publication Data

US 2013/0155224 A1    Jun. 20, 2013

(30) Foreign Application Priority Data

Dec. 19, 2011 (JP) ................. 2011-277661
May 29, 2012 (JP) ................. 2012-121496

(51) Int. Cl.
*G01B 11/26* (2006.01)
*G01C 15/00* (2006.01)

(52) U.S. Cl.
CPC ............ *G01B 11/26* (2013.01); *G01C 15/002* (2013.01)

(58) Field of Classification Search
CPC .............................. G01C 15/002; G01B 11/26
(Continued)

(56) References Cited

U.S. PATENT DOCUMENTS

| 4,272,165 A | 6/1981 | Muchel et al. |
| 4,643,556 A * | 2/1987 | Fujiwara ................ G02B 7/282 |
| | | 348/345 |

(Continued)

FOREIGN PATENT DOCUMENTS

| CN | 1618007 A | 5/2005 |
| CN | 101458081 A | 6/2009 |

(Continued)

OTHER PUBLICATIONS

Notice of Allowance mailed Jul. 3, 2014 in co-pending U.S. Appl. No. 13/718,329.

(Continued)

*Primary Examiner* — Christopher S Kelley
*Assistant Examiner* — Deirdre Beasley
(74) *Attorney, Agent, or Firm* — Nields, Lemack & Frame, LLC (57) ABSTRACT

A rotation angle detecting apparatus comprises a bearing holder, a rotation shaft rotatably supported by the bearing holder, a shaft portion space formed in the rotation shaft, a bearing holder space formed in the bearing holder, an angle detection pattern in the shaft portion space, a reference pattern and an image sensor in the bearing holder space, an optical system which exists across the shaft portion space and the bearing holder space and forms a projection image of the angle detection pattern and a projection image of the reference pattern on the image sensor, a photodetection switching means for selectively projecting the projection images of the angle detection pattern and the reference pattern onto the image sensor, and an arithmetic device for calculating a rotation angle of the rotation shaft based on a deviation between the reference pattern and the angle detection pattern received by the image sensor.

13 Claims, 7 Drawing Sheets

(58) Field of Classification Search
USPC .................................................. 348/169, 136
See application file for complete search history.

(56) References Cited

U.S. PATENT DOCUMENTS

| | | | | |
|---|---|---|---|---|
| 5,216,480 | A * | 6/1993 | Kaneko | G01C 1/02 250/203.2 |
| 5,389,774 | A * | 2/1995 | Gelman | G01M 11/02 250/201.1 |
| 5,784,155 | A * | 7/1998 | Ohtomo | G01C 15/004 356/141.1 |
| 5,898,490 | A * | 4/1999 | Ohtomo | G01C 15/004 356/141.1 |
| 5,900,930 | A * | 5/1999 | Simon | G01D 5/2497 250/231.13 |
| 6,226,035 | B1 * | 5/2001 | Korein | G02B 13/06 348/335 |
| 6,473,166 | B1 * | 10/2002 | Ohishi | G01C 15/002 356/141.1 |
| 6,621,565 | B2 * | 9/2003 | Pratt | G01C 15/002 356/141.1 |
| 6,657,211 | B2 | 12/2003 | Benner | |
| 6,782,015 | B1 * | 8/2004 | Kawatani | G01C 15/004 372/24 |
| 6,892,464 | B2 | 5/2005 | Ohtomo et al. | |
| 6,936,817 | B2 | 8/2005 | Feuerbaum | |
| 6,992,757 | B2 | 1/2006 | Holcomb et al. | |
| 7,041,961 | B2 | 5/2006 | Siraky | |
| 7,199,355 | B2 * | 4/2007 | Lippuner | G01D 5/3473 250/231.13 |
| 7,214,917 | B2 * | 5/2007 | Ohtomo | G01C 15/002 250/206.1 |
| 7,515,256 | B2 * | 4/2009 | Ohtomo | G01C 15/002 356/141.1 |
| 7,697,127 | B2 | 4/2010 | Vogel et al. | |
| 8,031,334 | B2 | 10/2011 | Lippuner et al. | |
| 8,056,250 | B2 | 11/2011 | Yanata | |
| 8,124,928 | B2 | 2/2012 | Villaret | |
| 8,321,167 | B2 | 11/2012 | Haijima et al. | |
| 8,345,259 | B2 | 1/2013 | Parriaux et al. | |
| 8,836,930 | B2 | 9/2014 | Kumagai et al. | |
| 2002/0186361 | A1 * | 12/2002 | Ueno | G01C 1/02 356/4.01 |
| 2003/0048355 | A1 * | 3/2003 | Shimoyama | G01C 15/00 348/79 |
| 2004/0246468 | A1 * | 12/2004 | Ohtomo | G01C 15/00 356/139.1 |
| 2005/0115087 | A1 | 6/2005 | Noltemeyer | |
| 2007/0081146 | A1 * | 4/2007 | Kumagai | G01C 9/06 356/139.1 |
| 2007/0171288 | A1 * | 7/2007 | Inoue | G06T 1/0064 348/241 |
| 2008/0069406 | A1 * | 3/2008 | Matsuo | G06K 9/00771 382/106 |
| 2009/0002510 | A1 * | 1/2009 | Uchihashi | H04N 17/00 348/222.1 |
| 2009/0119050 | A1 * | 5/2009 | Hayashi | G01C 15/002 702/94 |
| 2009/0153667 | A1 * | 6/2009 | Kumagai | G01S 17/66 348/169 |
| 2009/0171610 | A1 * | 7/2009 | Haijima | G01C 15/002 702/95 |
| 2009/0231574 | A1 * | 9/2009 | Vogel | G01D 5/3473 356/154 |
| 2009/0235543 | A1 * | 9/2009 | Hayashi | G01C 3/02 33/293 |
| 2009/0241359 | A1 * | 10/2009 | Hayashi | G01C 15/004 33/284 |
| 2010/0209090 | A1 * | 8/2010 | Kludas | G01C 3/08 396/89 |
| 2011/0044561 | A1 | 2/2011 | Braunecker et al. | |
| 2011/0193997 | A1 * | 8/2011 | Hatakeyama | H04N 5/3572 348/241 |
| 2011/0310125 | A1 * | 12/2011 | McEldowney | G06F 3/017 345/660 |
| 2013/0155397 | A1 | 6/2013 | Kumagai et al. | |
| 2015/0096181 | A1 * | 4/2015 | Plangger | G01S 7/4817 33/290 |

FOREIGN PATENT DOCUMENTS

| | | |
|---|---|---|
| CN | 101506621 A | 8/2009 |
| CN | 201952690 A | 1/2011 |
| DE | 19750474 A1 | 6/1999 |
| JP | 2003-5004 A | 1/2003 |
| JP | 2008-241529 A | 10/2008 |
| JP | 2009-156773 A | 7/2009 |
| WO | 2009/103342 A1 | 8/2009 |

OTHER PUBLICATIONS

Extended European Search Report completed Nov. 12, 2013 in co-pending European patent application No. EP 12197876.1.
Extended European Search Report completed Nov. 8, 2013 in co-pending European patent application No. EP 12197889.4.
Office Action mailed Jan. 31, 2014 in co-pending U.S. Appl. No. 13/718,329.
Chinese communication issued Sep. 16, 2014 in corresponding Chinese patent application No. 201210555178.3.

* cited by examiner

ROTATION ANGLE DETECTING APPARATUS AND SURVEYING INSTRUMENT

BACKGROUND OF THE INVENTION

The present invention relates to a rotation angle detecting apparatus for detecting a rotation angle and a surveying instrument which uses the rotation angle detecting apparatus.

As an apparatus for detecting a rotation angle, there is a rotation angle detecting apparatus, and the rotation angle detecting apparatus is used as an angle detector in case of detecting an elevation angle or a horizontal angle in a surveying apparatus.

The miniaturization and the high accuracy of recent surveying instrument are demanded, and further, a reduction in cost is also demanded.

For example, as a surveying instrument using a rotation angle detecting apparatus, there is a total station, and the total station measures a distance to a object to be measured, and an elevation angle or a horizontal angle of the object to be measured.

In the measurement errors of the total station, an error of a measurement value due to an angular error corresponds to a product obtained by multiplying the angular error by the distance to a object to be measured, and the error of the measurement value is proportionate to the distance. Therefore, an angular accuracy is demanded to a degree of a second. As one of causes of an increase in price of the total station, there is a demand for a high accuracy of an angle detection accuracy and a rotation accuracy.

As the rotation angle detecting apparatus for use in the surveying instrument, a highly accurate encoder has been conventionally used, however, an accuracy of each component constituting the encoder or the stability after assembling is a problem, and the highly accurate encoder is expensive. Further, since an angular error is caused due to a fabrication error of the encoder itself and a detection error as well as a rotational error owing to the runout of a rotation shaft. Therefore, it is difficult to set an angle detection accuracy to a demanded accuracy, just by managing a processing accuracy of a lone component, and the fine adjustment and fine finishing in an assembling state of a rotation shaft and a bearing holder are required, which results in expensiveness.

SUMMARY OF THE INVENTION

It is an object of the present invention to provide a rotation angle detecting apparatus that enables highly accurate angular detection with a simple structure and a surveying instrument using the rotation angle detecting apparatus.

To attain the above object, a rotation angle detecting apparatus according the present invention comprises a bearing holder, a rotation shaft rotatably supported by the bearing holder, a shaft portion space formed in the rotation shaft, a bearing holder space formed in the bearing holder, an angle detection pattern accommodated in the shaft portion space, a reference pattern provided in the bearing holder space, an image sensor provided in the bearing holder space, an optical system which exists across the shaft portion space and the bearing holder space and forms a projection image of the angle detection pattern and a projection image of the reference pattern on the image sensor, a photodetection switching means for selectively projecting the projection image of the angle detection pattern and the projection image of the reference pattern onto the image sensor, and an arithmetic device for calculating a rotation angle of the rotation shaft based on a signal from the image sensor, and in the rotation angle detecting apparatus, the arithmetic device detects the rotation angle of the rotation shaft based on a deviation between a signal from the image sensor which has received the reference pattern and a signal from the image sensor which has received the angle detection pattern.

Further, in the rotation angle detecting apparatus according to the present invention, the arithmetic device acquires from the image sensor the signal which has received the reference pattern and the signal which has received the angle detection pattern every time the measurement is carried out.

Further, in the rotation angle detecting apparatus according to the present invention, the arithmetic device detects a runout of the rotation shaft based on a deviation between the signal from the image sensor which has received the reference pattern and the signal from the image sensor which has received the angle detection pattern.

Further, in the rotation angle detecting apparatus according to the present invention, each of the angle detection pattern and the reference pattern has a line-segment pattern in which line segments extending in a radial direction are arranged on a total circumference at a predetermined angle pitch and which has a ring-like track constituted of the line segments.

Further, in the rotation angle detecting apparatus according to the present invention, each of the angle detection pattern and the reference pattern has a centering pattern indicating a center position.

Further, in the rotation angle detecting apparatus according to the present invention, the arithmetic device has a storage unit for storing the signals from the image sensor, and the arithmetic device sets at least one first scan line which is a concentric circle on the line-segment pattern of each of a stored angle detection pattern image and a stored reference pattern image, sets a second scan line which is a concentric circle on a reference designation pattern of each of the angle detection pattern image and the reference pattern image, determines deviations of the angel detection pattern image and the reference pattern image based on a signal obtained by scanning the scan line and based on a signal obtained by scanning the reference designation pattern, and detects a rotation angle of the rotation shaft based on both the deviations.

Further, in the rotation angle detecting apparatus according to the present invention, a rotation angle between the angle detection pattern image and the reference pattern image is calculated based on the number of the line segments which are present between the reference designation patterns of the two images and based on a phase difference between the line segments of the two images.

Further, in the rotation angle detecting apparatus according to the present invention, the phase difference is an average of the phase differences determined in regard to a necessary number of line segments.

Further, in the rotation angle detecting apparatus according to the present invention, the arithmetic device sets divided portions at least every 90° in the angle detection pattern along a circumferential direction, classifies the divided portions into a set of two divided portions which are different by 180° and another set of divided portions which is orthogonal to the set, and determines a center of the one set of the divided portions from a value which is a half of a phase difference acquired by scanning the other set of the divided portions.

Further, in the rotation angle detecting apparatus according to the present invention, the arithmetic device, in a case where the rotation shaft is rotated at a predetermined angle pitch, determines a pattern center every rotation at the predetermined angle by using the angle detection pattern, further, determines a deviation between the pattern center and a center of the reference pattern, acquires an eccentric circle obtained from a locus of the deviation of the pattern centers, and measures a runout at a time of the angle measurement based on a deviation between the eccentric circle and the center obtained from the angle detection pattern.

Further, in the rotation angle detecting apparatus according to the present invention, the arithmetic device, in a case where the rotation shaft is rotated at a predetermined angle pitch, determines both pattern centers every rotation at the predetermined angle by the angle detection pattern and the reference pattern, further determines a deviation between both the pattern centers, acquires an eccentric circle obtained from a locus of the deviation between both the pattern centers, and measures a runout at a time of the angle measurement based on a deviation of a difference between the center obtained from the angle detection pattern and the center obtained from the reference pattern in accordance with each measurement from the eccentric circle.

Further, a surveying instrument according to the present invention comprises a base portion, a mount rotatably provided on the base portion via a first rotation shaft having a vertical shaft center line, a telescope unit rotatably provided on the mount via a second rotation shaft having a horizontal shaft center line, a first rotation angle detecting apparatus which is provided between the first rotation shaft and the base and has an equivalent configuration to a configuration of the rotation angle detecting apparatus, and a second rotation angle detecting apparatus which is provided between a second rotation shaft and the mount and has an equivalent configuration to a configuration of the rotation angle detecting apparatus.

According to the present invention, the rotation angle detecting apparatus comprises a bearing holder, a rotation shaft rotatably supported by the bearing holder, a shaft portion space formed in the rotation shaft, a bearing holder space formed in the bearing holder, an angle detection pattern accommodated in the shaft portion space, a reference pattern provided in the bearing holder space, an image sensor provided in the bearing holder space, an optical system which exists across the shaft portion space and the bearing holder space and forms a projection image of the angle detection pattern and a projection image of the reference pattern on the image sensor, a photodetection switching means for selectively projecting the projection image of the angle detection pattern and the projection image of the reference pattern onto the image sensor, and an arithmetic device for calculating a rotation angle of the rotation shaft based on a signal from the image sensor, and in the rotation angle detecting apparatus, the arithmetic device detects the rotation angle of the rotation shaft based on a deviation between a signal from the image sensor which has received the reference pattern and a signal from the image sensor which has received the angle detection pattern. As a result, the apparatus can be configured without being dependent on an installation accuracy of the image sensor.

Further, according to the present invention, in the rotation angle detecting apparatus, the arithmetic device acquires from the image sensor the signal which has received the reference pattern and the signal which has received the angle detection pattern every time the measurement is carried out. As a result, even if the installation accuracy of the image sensor varies due to a change in temperature or the aging, the measurement can be highly accurately carried out.

Further, according to the present invention, in the rotation angle detecting apparatus, the arithmetic device detects a runout of the rotation shaft based on a deviation between the signal from the image sensor which has received the reference pattern and the signal from the image sensor which has received the angle detection pattern. As a result, the runout is allowed to be present, a rotation angle can be detected, thus a finishing accuracy and an assembling accuracy of each component do not have to be therefore increased, and a cost can be reduced.

Further, according to the present invention, in the rotation angle detecting apparatus, each of the angle detection pattern and the reference pattern has a centering pattern indicating a center position. As a result, the center position of each of the angle detection pattern and the reference pattern can be easily detected.

Further, according to the present invention, in the rotation angle detecting apparatus, the arithmetic device has a storage unit for storing the signals from the image sensor, and the arithmetic device sets at least one first scan line which is a concentric circle on the line-segment pattern of each of a stored angle detection pattern image and a stored reference pattern image, sets a second scan line which is a concentric circle on a reference designation pattern of each of the angle detection pattern image and the reference pattern image, determines deviations of the angel detection pattern image and the reference pattern image based on a signal obtained by scanning the scan line and based on a signal obtained by scanning the reference designation pattern, and detects a rotation angle of the rotation shaft based on both the deviations. As a result, a rotation angle exceeding a pattern pitch can be easily detected.

Further, according to the present invention, in the rotation angle detecting apparatus, the phase difference is an average of the phase differences determined in regard to a necessary number of line segments. As a result, a shape error, a luminosity unevenness, and others of each line segment are averaged.

Further, according to the present invention, in the rotation angle detecting apparatus, the arithmetic device sets divided portions at least every 90° in the angle detection pattern along a circumferential direction, classifies the divided portions into a set of two divided portions which are different by 180° and another set of divided portions which is orthogonal to the set, and determines a center of the one set of the divided portions from a value which is a half of a phase difference acquired by scanning the other set of the divided portions. As a result, even if the angle detection pattern or the reference pattern is decentered, the center position can be accurately detected.

Further, according to the present invention, in the rotation angle detecting apparatus, the arithmetic device, in a case where the rotation shaft is rotated at a predetermined angle pitch, determines a pattern center every rotation at the predetermined angle by using the angle detection pattern, further, determines a deviation between the pattern center and a center of the reference pattern, acquires an eccentric circle obtained from a locus of the deviation of the pattern centers, and measures a runout at a time of the angle measurement based on a deviation between the eccentric circle and the center obtained from the angle detection pattern. As a result, even if a component error or an assembling error is present, the runout can be accurately measured.

Further, according to the present invention, in the rotation angle detecting apparatus, the arithmetic device, in a case where the rotation shaft is rotated at a predetermined angle pitch, determines both pattern centers every rotation at the predetermined angle by the angle detection pattern and the reference pattern, further determines a deviation between both the pattern centers, acquires an eccentric circle obtained from a locus of the deviation between both the pattern centers, and measures a runout at a time of the angle measurement based on a deviation of a difference between the center obtained from the angle detection pattern and the center obtained from the reference pattern in accordance with each measurement from the eccentric circle. As a result, even if a component error or an assembling error is present and the image sensor is displaced, the runout can be accurately measured.

Furthermore, according to the present invention, the surveying instrument comprises a base portion, a mount rotatably provided on the base portion via a first rotation shaft having a vertical shaft center line, a telescope unit rotatably provided on the mount via a second rotation shaft having a horizontal shaft center line, a first rotation angle detecting apparatus which is provided between the first rotation shaft and the base and has an equivalent configuration to a configuration of the rotation angle detecting apparatus, and a second rotation angle detecting apparatus which is provided between a second rotation shaft and the mount and has an equivalent configuration to a configuration of the rotation angle detecting apparatus. As a result, a rotation angle can be detected without using an expensive encoder, a high cost is not required for assembling the rotation shaft or the bearing holder, and the fabrication costs can be reduced.

BRIEF DESCRIPTION OF THE DRAWINGS

FIG. 7A and FIG. 7B are waveform charts of the signals obtained by the angle detection pattern, where

DETAILED DESCRIPTION OF THE PREFERRED EMBODIMENT

Detailed description will be given below on embodiments of the present invention by referring to the drawings.

First, in FIG. 1, description will be given on a rotation angle detecting apparatus according to an embodiment of the present invention.

Figure 1:
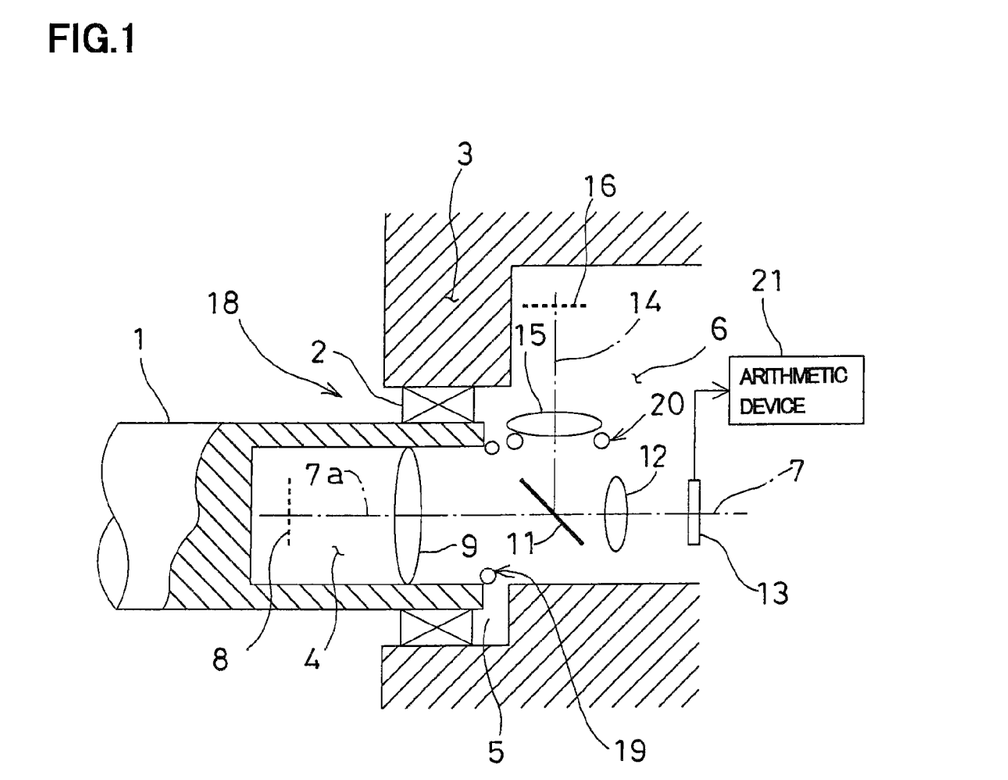
FIG. 1 is a schematic block diagram of a rotation angle detecting apparatus according to an embodiment of the present invention.

In FIG. 1, reference numeral 1 is a rotation shaft whose rotation angle is detected, and the rotation shaft 1 is rotatably supported by a shaft support portion 3 via a bearing 2.

At an end portion of the rotation shaft 1, a cylindrical shaft portion space 4 is formed concentrically with a center line of the rotation shaft 1, and a shaft end portion has a hollow structure. In the shaft support portion 3, a shaft fit hole 5 is formed concentrically with the center line of the rotation shaft 1. The rotation shaft 1 is attached and engaged with the shaft fit hole 5 via the bearing 2. An accommodation space 6 is formed in the shaft support portion 3, and the accommodation space 6 is continuous with the shaft fit hole 5 and the shaft portion space 4.

An optical axis 7 is set in the accommodation space 6, the optical axis 7 is configured to coincide with the center line of the rotation shaft 1, and an angle detection pattern 8, a first condenser lens 9, a half mirror 11, a second condenser lens 12, and an image sensor 13 are arranged on the optical axis 7 from a rotation shaft 1 side. Further, a third condenser lens 15 and a reference pattern 16 are arranged on a branched optical axis 14 branched by the half mirror 11.

The angle detection pattern 8 and the first condenser lens 9 are accommodated in the shaft portion space 4. An optical axis 7a of the first condenser lens 9 coincides with the center line of the rotation shaft 1 and, in a state that the center line of the rotation shaft 1 coincides with the optical axis 7 (that is, a state that the rotation shaft 1 does not have runout or the eccentricity with respect to the shaft fit hole 5), the optical axis 7a coincides with the optical axis 7.

The angle detection pattern 8 and the first condenser lens 9 are set in such a manner that the angle detection pattern 8 is provided at a focal position of the first condenser lens 9 and the optical axis 7a runs through the center of the angle detection pattern 8.

The image sensor 13 is held at a focal point of the second condenser lens 12.

The reference pattern 16 is arranged at a focal point of the third condenser lens 15. It is preferable for a material of members forming the angle detection pattern 8 and the reference pattern 16 to be equal to a material of the rotation shaft 1 or a material of the shaft support member 3 or have the same thermal expansion coefficient as thermal expansion coefficient of the materials of the rotation shaft 1 and the shaft support portion 3.

The first condenser lens 9 and the third condenser lens 15 have the same magnifying power, and the second condenser lens 12 has a magnifying power equal to or lower than each magnifying power of the first condenser lens 9 and the third condenser lens 15. For example, the magnifying power of each of the first condenser lens 9 and the third condenser lens 15 is a magnifying power of 2, and the magnifying power of the second condenser lens 12 is a magnifying power of 1. Therefore, an image of each of the angle detection pattern 8 and the reference pattern 16 is reduced and projected onto the image sensor 13.

It is to be noted that a basic shape of each of the angle detection pattern 8 and the reference pattern 16 is a circular shape, and a diameter of each of these patterns is approximately 5 mm to 10 mm. Further, the angle detection pattern 8 may be equal to or different from the reference pattern 16. When these patterns are different, the shapes that enable determining an angle deviation and a deviation of a center position between both the patterns can suffice.

The image of the angle detection pattern 8 and the image of the reference pattern 16 are formed on the image sensor 13, and further, a photodetection switching means 36 (as to be described later) 36 is provided so that the image sensor 13 can selectively receive the image of the angle detection pattern 8 and the image of the reference pattern 16. As the photodetection switching means 36, illuminating means 19 and 20 for illuminating the angle detection pattern 8 and the reference pattern 16 are individually provided, and the illuminating means 19 and 20 are configured to be selectively turned on. Alternatively, as another photodetection switching means, a shutter may be provided so as to get across the optical axis 7 and the branched optical axis 14, the shutter may selectively block the optical axis 7 and the branched optical axis 14 so that the optical paths can be switched.

As the image sensor 13, a CCD or a CMOS sensor or the like which is an aggregation of pixels is used. The optical axis 7 is set so as to run through an origin of a coordinate system (X0-Y0) which is assumed with respect to the image sensor 13, and a position (a coordinate) of each pixel can be identified on the image sensor 13 with the optical axis 7 being determined as the origin.

A photodetection signal from the image sensor 13 is input to an arithmetic device 21, and the arithmetic device 21 is configured to measure a rotation angle of the rotation shaft 1 and the runout caused due to a tilt (a tilting angle) of the rotation shaft 1 based on the photodetection signal.

The angle detection pattern 8, the first condenser lens 9, the half mirror 11, the image sensor 13, the third condenser lens 15, the reference pattern 16, and others accommodated in the shaft portion space 4 and the accommodation space 6 constitute a primary part of a rotation angle detecting apparatus 18. Furthermore, the first condenser lens 9, the half mirror 11, the second condenser lens 12, and the third condenser lens 15 constitute a rotation angle detection optical system which forms a projection image of the angle detection pattern 8 and a projection image of the reference pattern 16 on the image sensor 13.

Figure 2:
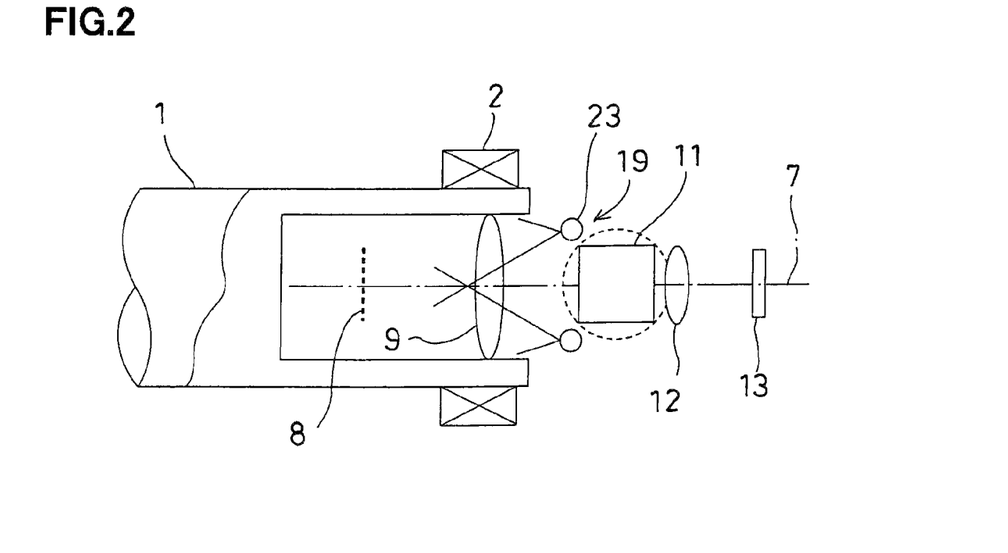
FIG. 2 is a schematic view showing an example of illuminating means of the rotation angle detecting apparatus.

FIG. 2 shows an example of the illuminating means 19 and 20 for the angle detection pattern 8 and the reference pattern 16, and the illuminating means 19 will now be described.

LEDs 23 are arranged at predetermined intervals on a circumference with the optical axis 7 as a center, and the angle detection pattern 8 is illuminated through the first condenser lens 9. It is to be noted that the LEDs 23 are supported on a shaft support portion 3 side and receive the electric power from the shaft support portion 3 side. In addition, end surfaces of optical fibers may be arranged at predetermined intervals on the circumference with the optical axis 7 as the center, and the illumination lights may enter from other end surfaces of the optical fibers. Moreover, the illumination units may be arranged on the opposite side of the first condenser lens 9 of the angle detection pattern 8 and on the opposite side of the third condenser lens 15 of the reference pattern 16, and the illumination may be performed from the back sides of the angle detection pattern 8 and the reference pattern 16.

Although not shown, it is so designed that the reference pattern 16 is illuminated by the illuminating means 20 having the same configuration as the illuminating means 19 and, as described above, the illuminating means 19 for the angle detection pattern 8 and the illuminating means 20 for the reference pattern 16 are controlled so as to be selectively turned on.

Figure 3:
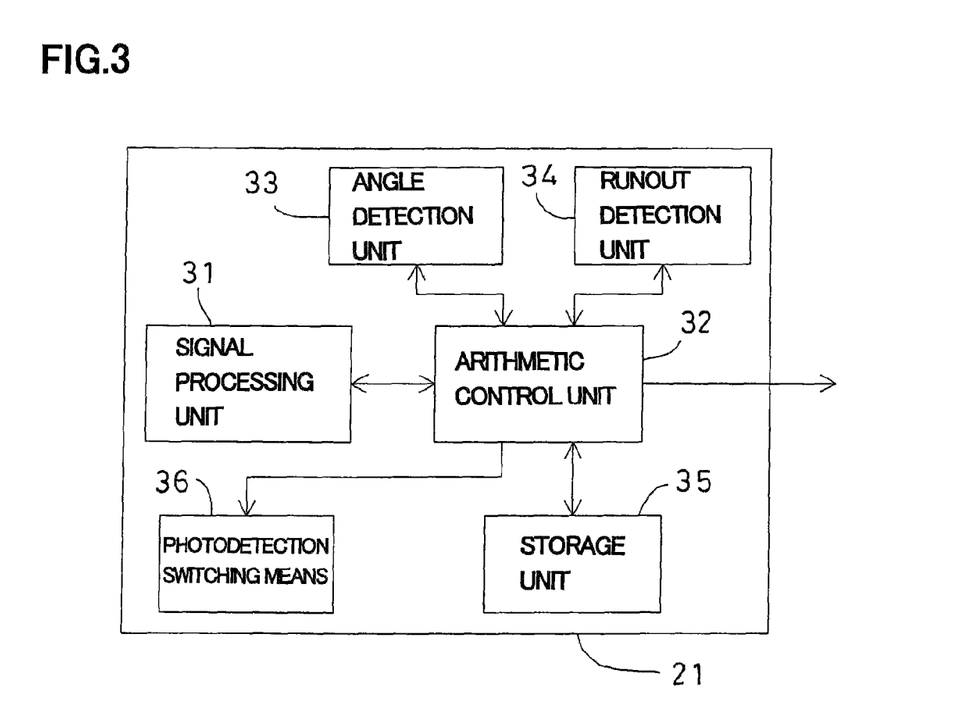
FIG. 3 is a schematic block diagram of an arithmetic device in the present embodiment.

As shown in FIG. 3, the arithmetic device 21 is mainly constituted of a signal processing unit 31, an arithmetic control unit 32, an angle detection unit 33, a runout detection unit 34, a storage unit 35, the photodetection switching means 36, and others.

The signal processing unit 31 amplifies data output from the image sensor 13 or executes the signal processing so that each signal can be stored.

The storage unit 35 stores a control program which controls the lighting of the illuminating means 19 and 20 and controls the timing for acquiring a signal from the image sensor 13, and others, a rotation angle arithmetic program configured to detect a rotation angle of the rotation shaft 1, a runout arithmetic program configured to detect the runout of the rotation shaft 1, a signal processing program configured to execute the signal processing, e.g., extracting a signal required for detecting a rotation angle or detecting the runout, and other programs. Furthermore, the storage unit 35 stores image data output from the image sensor 13.

The arithmetic control unit 32 controls an arithmetic operation based on the various programs, controls the lighting of the illuminating means 19 and 20 using the photodetection switching means 36, and synchronously controls the acquisition of each signal from the image sensor 13 or the like.

The angle detection unit 33 calculates a rotation angle of the rotation shaft 1 based on a signal from the image sensor 13, and the angle detection unit 33 is mainly constituted of the rotation angle arithmetic program and the arithmetic control unit 32. Furthermore, the runout detection unit 34 calculates the runout of the rotation shaft 1 based on a signal from the image sensor 13, and the runout detection unit 34 is mainly constituted of the runout arithmetic program and the arithmetic control unit 32.

Next, by referring to FIG. 4, description will be given on an example of each of the angle detection pattern 8 and the reference pattern 16 used in the present embodiment. It is to be noted that the same pattern is assumed to be used for the angle detection pattern 8 and the reference pattern 16, and the angle detection pattern 8 will be explained hereinafter.

A basic shape of the angle detection pattern 8 is a circle, and the center of the angle detection pattern 8 is configured to substantially coincide with the optical axis of the first condenser lens 9, i.e., the optical axis 7a.

The angle detection pattern 8 is constituted of a circular pattern 25 which is a centering pattern provided at the center and a line-segment pattern 26 and a reference designation pattern 27 which are arranged as patterns for angle detection around the circular pattern 25 concentrically with the circular pattern 25. The circular pattern 25 consists of a plurality of perfect circles (two concentric multiple circles in the drawing) drawn with a predetermined line width. It is to be noted that, as the centering pattern, a pattern that enables determining the center can suffice and, for example, the cross lines can be used.

The line-segment pattern 26 has a configuration that n line segments 26a (the dark filled portions in the drawing) which are extended in a radial direction and have a predetermined length are arranged on a total circumference at an equiangular pitch and the line-segment pattern is a ring-like track formed of the line segments 26a. In other words, in the line-segment pattern 26, a ring having a predetermined track width is equally divided into 2n on the total circumference by 2n radial lines, and the line segments 26a are formed every other row. Each line segment 26a has a wedge-like shape and has a center angle α which is 360°/2n. Further, the center of the line-segment pattern 26 is the same as the center of the circular pattern 25.

The reference designation pattern 27 is formed on the inner side of the line-segment pattern 26 and has an arc shape that is concentric with the line-segment pattern 26. Further, the reference designation pattern 27 is divided into a plurality of patterns along the circumferential direction, and each pattern is constituted of one position designation pattern 27a and direction designation patterns 27b arranged on each of both sides of the position designation pattern 27a.

The position designation pattern 27a has the same center angle as the line segment 26a, and the position designation pattern 27a is placed on the same radial line as one of the line segment 26a.

With respect to the position designation pattern 27a, the direction designation patterns 27b are arranged at symmetrical positions and have symmetrical shapes, and also have a width (a center angle 5α) across the three line segments 26a. It is to be noted that the width (a length in the circumferential direction) of the direction designation pattern 27b is not restricted to a width corresponding to the three line segments 26a, and any width different from a width of the line segment 26a can suffice.

The line segment 26a, the position designation pattern 27a, and the direction designation pattern 27b may be of a non-light-reflective type and any other portion may be of a light-reflective type, or the line segment 26a, the position designation pattern 27a, and the direction designation pattern 27b may be of the light-reflective type and any other portion may be of the non-light-reflective type. In the following description, description will be given assuming that the line segment 26a, the position designation pattern 27a, and the direction designation pattern 27b are of the non-light-reflective type.

Description will be given below on an operation of the rotation angle detecting apparatus 18.

In the rotation angle detecting apparatus 18, it is possible to detect a rotation angle and to detect the runout (a slant of the rotation shaft) involved by the rotation.

The illuminating means 19 illuminates the angle detection pattern 8. An image of the angle detection pattern 8 is reduced to ½ and projected onto the image sensor 13 by the operations of the first condenser lens 9 and the second condenser lens 12, and the image sensor 13 produces a signal associated with the received angle detection pattern 8.

Likewise, the illuminating means 20 illuminates the reference pattern 16, an image of the reference pattern 16 is reduced to ½ and projected onto the image sensor 13, and the image sensor 13 produces a signal associated with the reference pattern 16 as received.

First, the illuminating means 20 is turned on, the image of the reference pattern 16 is acquired by the image sensor 13, and a reference pattern image is stored in the arithmetic device 21. Then, the illuminating means 20 is turned off, the illuminating means 19 is turned on, and the image of the angle detection pattern 8 is acquired by the image sensor 13.

Based on the circular pattern 25 of the image of the reference pattern 16, a coarse center position (a coordinate in a coordinate system assumed in the image sensor 13) of the reference pattern 16 can be determined. The reference designation pattern 27 is scanned on an image along a locus of a circle (the circumferential direction) with the obtained coarse center position as the center, and a rotational position of the reference designation pattern 27 is detected.

Here, the rotational position of the reference designation pattern 27 means a coordinate on the image sensor 13. Alternatively, the rotational position means a rotation angle that reference designation pattern 27 rotates in a predetermined rotating direction (e.g., a clockwise direction) with respect to a coordinate axis with the coarse center position as the center in a state that the coordinate axis assumed on the image sensor 13 is translated parallel to the coarse center position. This rotation angle represents a displacement of the reference pattern 16 in the rotating direction (i.e., a displacement at a time of installing the reference pattern 16) with respect to the coordinate axis assumed on the image sensor 13.

Further, when the line-segment pattern 26 is scanned in the circumferential direction with the coarse center position as the center, a signal of a frequency component with the reference designation pattern 27 as a reference position can be obtained. Based on the signal of the frequency component, a rotation angle can be determined. Further, divided portions provided at least every 90° are set, and the divided portions are classified into a set of two divided portions which are 180° different and the other set of the divided portions that is orthogonal to the set of two divided portions. An accurate center position of the reference pattern 16 can be determined from a half of a phase difference obtained by scanning the one set of the divided portions and the other set of the divided portions.

Then, the image of the angle detection pattern 8 is acquired by the image sensor 13. Like a case of the reference pattern 16, the coarse center position is determined, the reference designation pattern 27 and the line-segment pattern 26 are scanned in the circumferential direction with the coarse center position as the center, and a rotational position and an accurate center position of the angle detection pattern 8 can be determined.

The accurate center position obtained from the angle detection pattern 8 is compared with the accurate center position obtained from the reference pattern 16 and a position displacement (a deviation) between both the accurate center positions on the image sensor 13 is determined. A rotational position of the reference designation pattern 27 in the angle detection pattern 8 or a rotational position of the reference designation pattern 27 in the reference pattern 16 and a frequency component of the line-segment pattern 26 in the angle detection pattern 8 or a frequency component of the line-segment pattern 26 in the reference pattern 16 are corrected based on the deviation. By comparison of the rotational position of the reference designation pattern 27 in the angle detection pattern 8 with rotational position of the reference designation pattern 27 in the reference pattern 16 after correction, a coarse rotation angle is determined, and further, a phase difference between the frequency component of the line-segment pattern 26 in the angle detection pattern 8 and the frequency component of the line-segment pattern 26 in the reference pattern 16 is determined. An angle that is less than one line-segment pattern (an accurate rotation angle) is determined based on the phase difference, and a highly accurate rotation angle is measured by a combination of the coarse rotation angle and the precise rotation angle.

Furthermore, in case of determining a rotation angle after the elapse of a predetermined time, if the elapsed time is not long, a rotational position of the reference designation pattern 27 and a frequency component of the line-segment pattern 26 are acquired in the angle detection pattern 8 only. Moreover, if the elapsed time is long, likewise, a rotational position of the reference designation pattern 27 and a frequency component of the line-segment pattern 26 obtained in the reference pattern 16 are compared with each other, and by this comparison, a highly accurate rotation angle after the elapse of the predetermined time can be measured.

Moreover, when the rotation angle obtained in regard to the angle detection pattern 8 before the elapse of the predetermined time is compared with the rotation angle obtained in regard to the angle detection pattern 8 after the elapse of the predetermined time, an amount of rotation in the elapsed time can be obtained, and further, differentiating the amount of rotation using the elapsed time enables acquiring a rotational speed.

Figure 5:
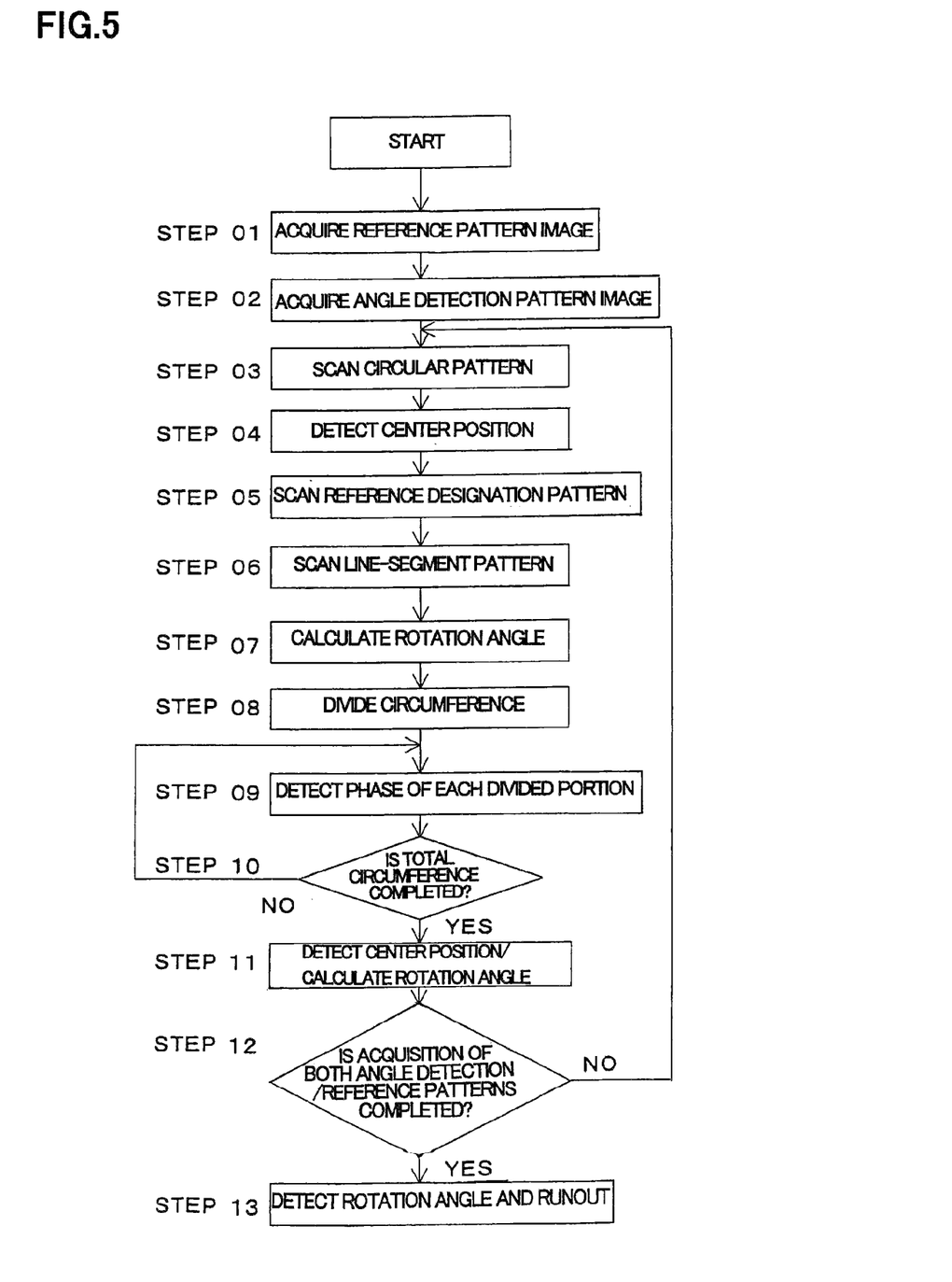
FIG. 5 is a flowchart of the angle detection according to the present embodiment.

By referring to FIG. 5 and FIG. 6, description will be given concretely on the detection of the rotation angle and the detection of the runout.

At STEP: 01 and STEP: 02, the reference pattern image and an angle detection pattern image of the rotation shaft 1 are acquired, and these images are stored in the storage unit 35, respectively. Scan lines are set on each of the image signals (the data stored in the storage unit 35) of the reference pattern image and the angle detection pattern image respectively, and the scan is carried out along the scan lines. Here, since each scan line is a virtual line set on the data, an arbitrary number of scan lines can be set at arbitrary positions, and increasing the number of the scan lines can improve a measurement accuracy.

Figure 6:
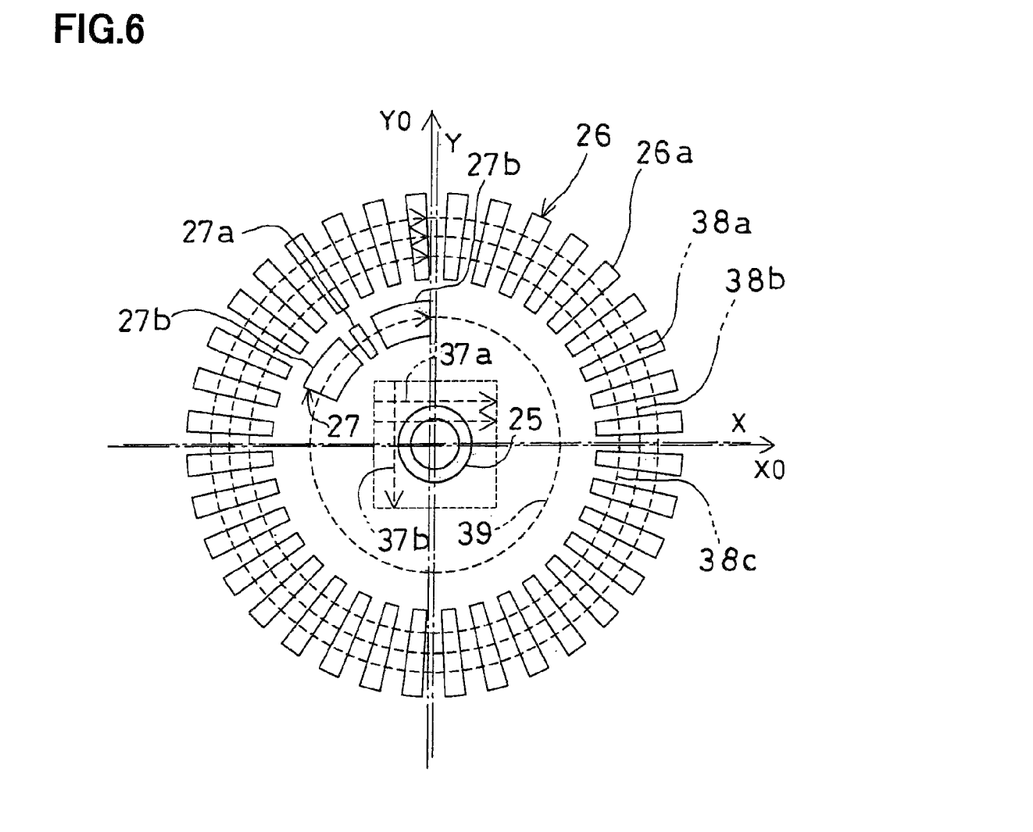
FIG. 6 is an explanatory drawing when the angle detection using the angle detection pattern is carried out.

FIG. 6 shows a relationship between the circular pattern 25, the line-segment pattern 26, the reference designation pattern 27, and the scan lines in each of the reference pattern image and the angle detection pattern image, and an X axis and a Y axis in FIG. 6 represent a coordinate system (X-Y) using the center of the reference pattern image or the angle detection pattern image as an origin. The coordinate axes shown here are obtained by translating parallel an X0 axis and a Y0 axis set on the image sensor 13 and, in a state that the center of the angle detection pattern 8 or the reference pattern 16 coincides with the optical axis 7, the X axis and Y axis shown in FIG. 6 coincide with the X0 axis and a Y0 axis assumed the image sensor 13.

Further, in FIG. 6, the filling processing for each line segment 26*a*, each position designation pattern 27*a*, and the direction designation pattern 27*b* is omitted.

The positions (a center position and a rotational position) of the reference pattern image and the angle detection pattern image in the image sensor 13 are determined, respectively. Either position can be determined first, but a description will be given on a situation where the position of the reference pattern image is first determined and the position of the angle detection pattern image is subsequently determined in the following procedure.

STEP: 03 First, in regard to the circular pattern 25, scan lines 37*a* and 37*b* are set so as to be parallel to the X0 axis and the Y0 axis, the scanning is carried out along the scan lines 37*a* and 37*b*, and the signals of the pixels placed on each of the scan lines 37*a* and 37*b* are acquired. Based on the acquired signals of the pixels, the circular pattern 25 is detected.

STEP: 04 When the circular pattern 25 is detected, the center of the circle, i.e., the center position of the reference pattern 16 on the X0-Y0 coordinate (which will be referred to as a coarse center position hereinafter) is determined, and determining a deviation of the coarse center position from the coordinate origin enables determining a displacement of the reference pattern 16 of the rotation angle detecting apparatus 18. It is to be noted that this displacement is measured as an installation error of the reference pattern 16.

Here, since the circular pattern 25 is constituted of multiple circles and the plurality of scan lines 37 are set, a plurality of pieces of data can be acquired, and further, a plurality of coarse center positions can be determined. When the plurality of coarse center positions as determined are averaged, an accuracy is improved.

Scan lines 38*a*, 38*b*, and 38*c* and a scan line 39 are set as the concentric multiple circles (four multiple circles in the drawing) with the determined coarse center position as the center. Additionally, although a point from which the scanning starts (a starting point) (a position of 0°) may be set at an arbitrary position on each of the scan lines 38*a*, 38*b*, and 38*c*, a reference position in the coordinate system (X-Y) is preferable, and this point is set to, e.g., a point crossing the Y axis.

Figure 7A:
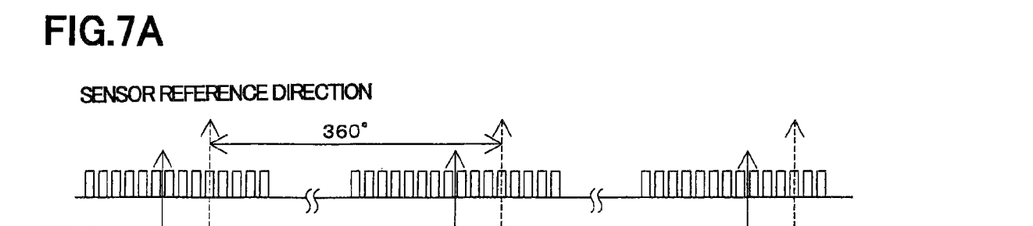
FIG. 7A shows a signal from a line-segment pattern and FIG. 7B shows a signal from a reference designation pattern.
Figure 7B:
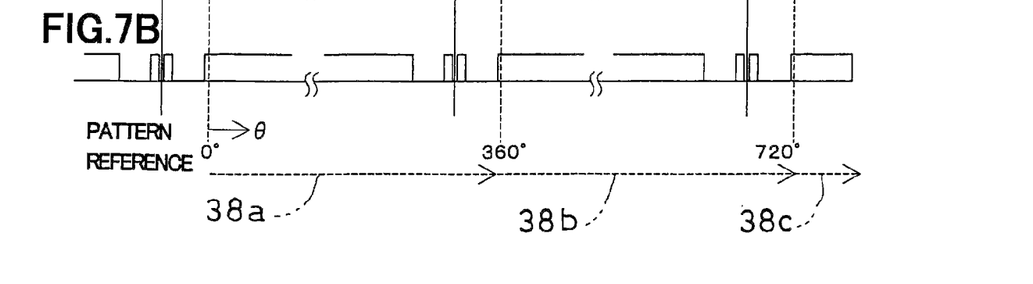

STEP: 05 In regard to the reference designation pattern 27, the scan line 39 is scanned, and a signal on the scan line 39 is acquired (see FIG. 7B). It is to be noted that FIG. 7B shows a state that a total circumferential scanning is carried out on the reference designation pattern 27 for a plurality of number of times, and the signals of the reference designation pattern 27 are acquired for every 360°.

STEP: 06 In regard to the line-segment pattern 26, the scan lines 38*a*, 38*b*, and 38*c* are scanned.

FIG. 7A shows signal outputs obtained when the line-segment pattern 26 is scanned, FIG. 7A shows signals acquired when the line-segment pattern 26 is scanned for three times and the scan line is changed from the scan line 38*a* to the scan line 38*b* and from the scan line 38*b* to the scan line 38*c* for every rotation (when a total circumferential scanning is carried out on each of the scan lines), and the signals are continuous in the drawing.

Figure 4:
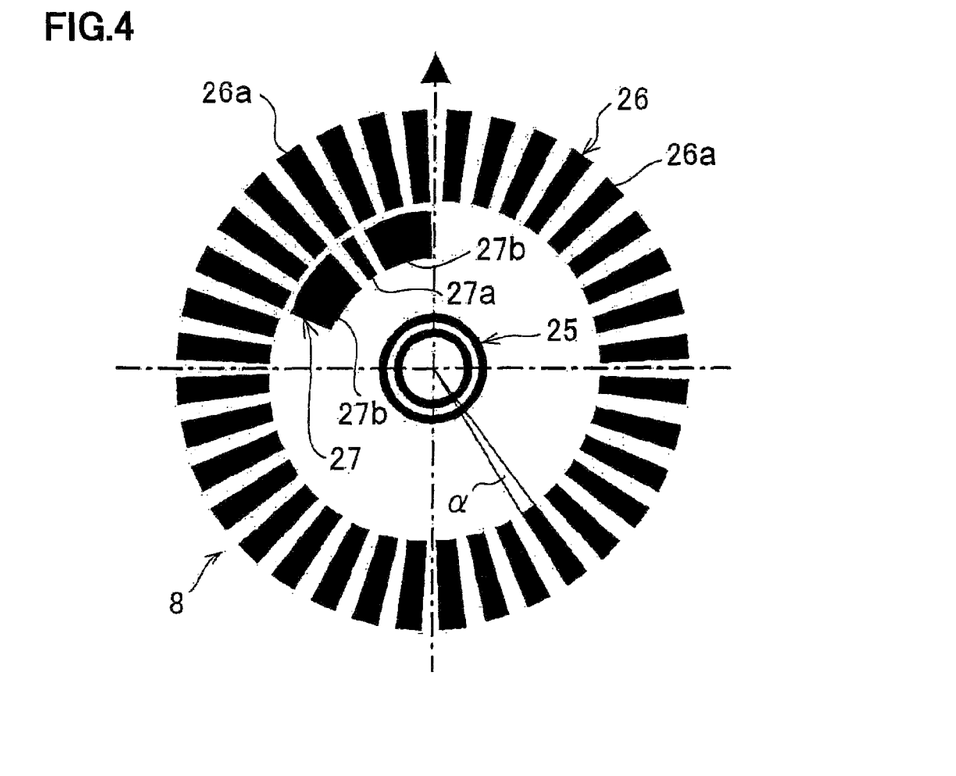
FIG. 4 is a view showing an example of each of an angle detection pattern and a reference pattern used in the present embodiment.

As shown in FIG. 4, the line-segment pattern 26 is obtained by alternately forming each blank portion and each line-segment pattern 26, and the blank portion and the line-segment pattern 26 form one cycle. Therefore, by scanning the line-segment pattern 26, a signal containing a frequency component (which will be referred to as a frequency signal) can be acquired. Furthermore, when the total circumferential scanning is carried out on each of the scan lines 38*a*, 38*b*, and 38*c* and the obtained frequency signals are averaged, a coarse frequency signal having a highly accurate frequency (a phase) can be acquired.

It is to be noted that FIG. 7A shows a state a position of the starting point (0°) of the scanning does not coincide with a phase 0° of the frequency component and the phase is shifted.

STEP: 07 Based on the signal acquired from the reference designation pattern 27 and the signal acquired from the line-segment pattern 26, a rotational position of the reference pattern image (a rotation angle with the coordinate system (X-Y) as a reference is determined.

Referring to FIG. 7B, the signal of the reference designation pattern 27 is present on a − (minus) side from the scan starting point (0°), and a rough rotation angle can be determined by counting the number of the line segments 26*a* from the scan starting point i.e., the number of frequencies (N). Moreover, since a phase of the frequency signal is shifted from the scan starting point, determining a phase difference σ enables determining an angle of a fraction.

Therefore, the rotation angle of the reference pattern image is as follows:

$$N \times 360°/n + \sigma \times 360°/n$$

Figure 8:
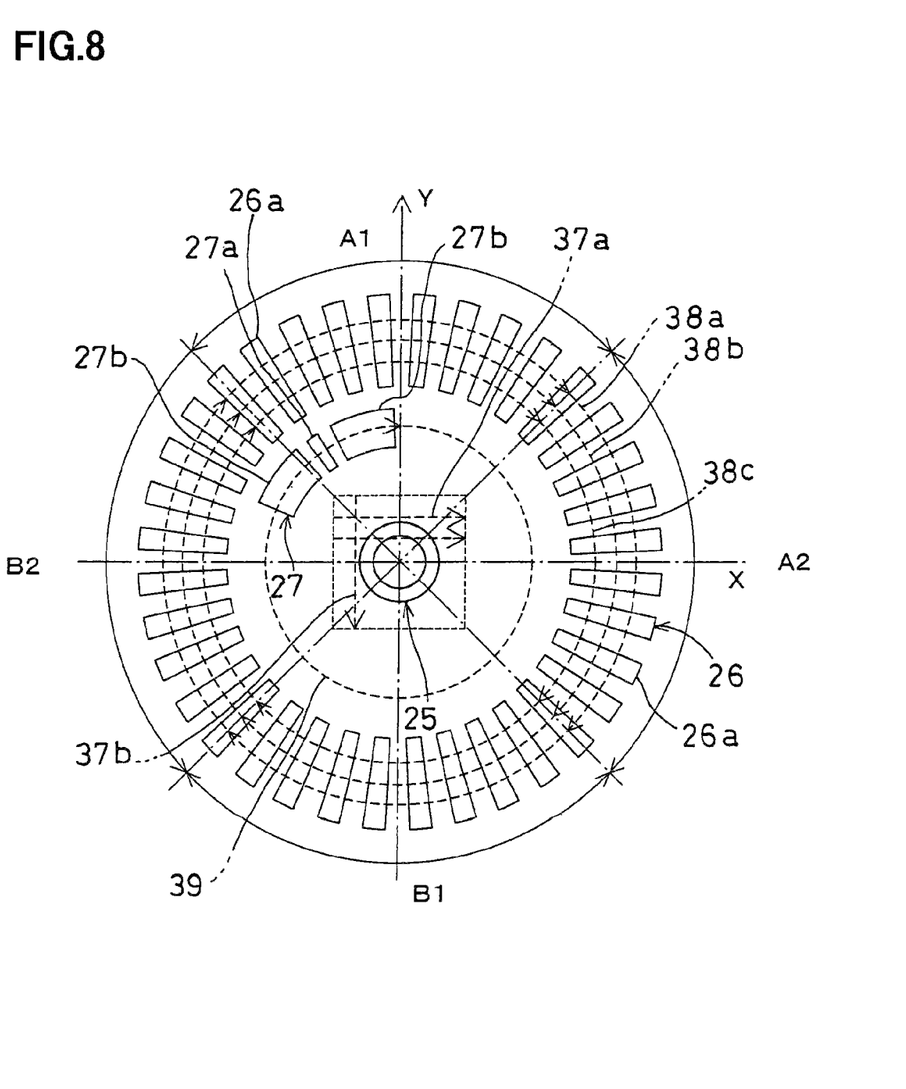
FIG. 8 is an explanatory drawing in case of determining a center position by using the angle detection pattern.

STEP: 08 With either the position designation pattern 27*a* or the direction designation pattern 27*b* of the reference designation pattern 27 as a reference, the line-segment pattern 26 is divided into an even number (divided into at least four) along the circumferential direction. FIG. 8 shows a case where the line-segment pattern 26 is divided into four portions. The divided portions belonging to one range of 180° are determined as A1 and A2, the divided portions belonging to the other range of 180° are determined as B1 and B2, and further, the divided portion A1 and the divided portion B1 are arranged to face each other, and the divided portion A2 and the divided portion B2 are arranged to face each other. Therefore, each phase of the corresponding divided portions are shifted by 180°, respectively.

STEP: 09 A total circumferential scanning is carried out on the entire line-segment pattern 26 along the scan line 38a, and the signals of the line segments 26a belonging to the respective divided portions are acquired. Likewise, the total circumferential scanning is carried out along the scan lines 38b and 38c, and the signals of the line segments 26a belonging to the respective divided portions are acquired. When the signals as acquired are averaged in accordance with each divided portion, a highly accurate frequency signal (which will be referred to as a "divided portion frequency signal" hereinafter) that cancels out a pattern formation error of the line segments 26a can be acquired.

STEP 10: When the phases of all the divided portions are detected, a deviation (a displacement amount) of the respective divided portion on the coordinate X0-Y0 based on each detected phase (or a coordinate of the center of each divided portion on the coordinate X0-Y0) is determined. A center position of a line-segment pattern image is determined based on the displacement amount determined from each divided portion. The center position determined here has a higher accuracy than the coarse center position determined based on the circular pattern 25 (which will be referred to as an accurate center position hereinafter).

STEP: 11 With the obtained accurate center position as a reference, an accurate rotational position of the reference designation pattern 27 is determined. That is, a highly accurately corrected X-Y coordinate system with the accurate center position determined as the origin can be obtained, a phase difference of each frequency signal can be determined in the X-Y coordinate system, and a highly accurate rotation angle can be determined based on the phase difference.

STEP: 12 In regard to the reference pattern 16, when the accurate center position of the reference pattern image, the accurate rotational position of the reference designation pattern 27, an accurate frequency signal, and further, the phase difference of the accurate frequency signal are acquired, also in regard to the angle detection pattern image, an accurate center position, the accurate rotational position of the reference designation position 27, an accurate frequency signal of the line-segment pattern 26, and a phase difference of the accurate frequency signal are similarly obtained.

Also in regard to the angle detection pattern image, the processes of STEP: 03 to STEP: 11 are repeated, and (an accurate center position)' and (a rotation angle)' ("'" will be added to each item concerning the angle detection pattern 8 hereinafter) are determined.

STEP: 13 When a deviation between the accurate center position and (the accurate center position)' is determined, a deviation, i.e., the runout of the reference pattern 16 and the angle detection pattern 8 is detected. When a deviation of the rotation angle and (the rotation angle)' is determined, a difference in rotation angle between the reference pattern 16 and the angle detection pattern 8, i.e., a rotation angle (an amount of rotation) of the rotation shaft 1 can be determined.

Since detecting a phase difference between the line-segment patterns 26 of the angle detection pattern 8 and the reference pattern 16 can suffice, the line-segment pattern 26 formed in each of the angle detection pattern 8 and the reference pattern 16 may not be formed on the total circumference or may be formed in a range of a predetermined angle. Further, even if the line-segment pattern 26 is formed on the total circumference, phase differences of a necessary number of line segments 26a may be determined, and an angle may be detected using an averaged phase difference.

Although each of the angle detection pattern 8 and the reference pattern 16 may include a pattern error, the total circumference of the scan lines 38 corresponds to 360°, and this value does not change. Therefore, when the signals are acquired over the total circumference and an angle is detected over the total circumference, an error factor included in each of the angle detection pattern 8 and the reference pattern 16 is offset, and the highly accurate angle detection is enabled.

In the above-described measurement, since the angle detection and the runout measurement are carried out by comparison of the reference pattern 16 with the angle detection pattern 8, even if a temperature of the image sensor 13 increases and changes during the measurement, an error is offset. Therefore, even in a measurement environment having a large temperature difference, the highly accurate measurement can be carried out with the high stability and reliability.

It is to be noted that the increase in temperature of the image sensor 13 is a phenomenon in an initial stage of the measurement, and the temperature is stabilized after the elapse of a predetermined time from the start of the measurement. Furthermore, a drift phenomenon of an electrical circuit often occurs in the initial stage of the measurement, and the number of times of occurrence of the drift phenomenon is reduced after the elapse of a predetermined time. Therefore, in regard to the acquisition of an image of the reference pattern 16 using the image sensor 13, the reference pattern 16 and the angle detection pattern 8 may be compared by using the images acquired at the approximately same clock time in the initial stage of the measurement and, after the elapse of a predetermined time, the reference pattern image and the angle detection pattern image in the measurement obtained at a predetermined time interval may be compared with each other.

Moreover, in the present embodiment, the runout can be more highly accurately measured by using the angle detection pattern 8 and the reference pattern 16.

A description will now be given with reference to FIG. 8. Although the angle detection pattern 8 will be explained below, the explanation can be likewise applied to the reference pattern 16. It is to be noted that, in the drawing, the filling of each of the line segments 26a, the position designation patterns 27a, and the direction designation patterns 27b is omitted in the drawing.

In regard to the angle detection pattern 8, the scan line 38a will be first described.

As described above, with either the position designation pattern 27a or the direction designation pattern 27b of the reference designation pattern 27 as a reference, the line-segment pattern 26 is divided into the four parts, i.e., the divided portion A1, the divided portion A2, the divided portion B1, and the divided portion B2 in the circumferential direction.

Like the example of highly accurately detecting an angle, (divided portion frequency signal) of the respective divided portions is determined. For example, (the divided portion frequency signal) of the divided portion A1 is determined.

Additionally, (the divided portion frequency signal) of the divided portion B1 having the 180° different phase is determined.

Further, (the divided portion frequency signals) of the divided portion A2 and the divided portion B2 having the phases that are 90° different from the phases of the divided portion A1 and the divided portion B1 are determined, respectively.

Then, the phase differences between (the divided portion frequency signals) of the divided portion A1, the divided portion B1, the divided portion A2, and the divided portion B2 are determined.

Each of the phase differences determined from the respective divided portions is set as a deviation amount on the rectangular coordinate set on the image sensor 13.

Based on each of the deviation amounts as calculated, a center position of each of the divided portion A1, the divided portion B1, the divided portion A2, and the divided portion B2 on the rectangular coordinate can be calculated.

A straight line connecting the center of the divided portion A1 with the center of the divided portion B1 (a center line Y) and a straight line connecting the center of the divided portion A2 with the center of the divided portion B2 (a center line X) are obtained. A center position of the centerline X (a midpoint of the center line X) and a center position of the center line Y (a midpoint of the center line Y) become a center position of the angle detection pattern 8, and a coordinate position on the rectangular coordinate (a coordinate position in the X-Y coordinate system) is calculated.

It is to be noted that the center line X and the center line Y are represented by the following expressions:

The center line $X=[\Phi(A1)-\Phi(B1)]/2$

The center line $Y=[\Phi(A2)-\Phi(B2)]/2$

Here each of $\Phi(A1)$, $\Phi(A2)$, $\Phi(B1)$, and $\Phi(B2)$ is a phase of each divided portion.

Likewise, in regard to the scan lines 38b and 38c, the respective center coordinates are determined, and all the center coordinates are average, and the center coordinate of the angle detection pattern 8 can be more highly accurately determined.

Like the coordinate of the center position as obtained, it is possible to calculate a magnitude of the runout and a direction of the runout of the center of the angle detection pattern 8 with respect to the coordinate of the center position acquired from the reference pattern 16.

Although having no runout in the rotation shaft at a time of rotation is preferable, it is very difficult to approximate the runout to 0 by increasing a component accuracy and by raising an assembling accuracy and, and a production costs also increase. The runout described herein means a looseness of the rotation shaft.

In the present embodiment, the runout of the rotation shaft 1 is allowed, and the more highly accurate angle detection is enabled.

First, in a state that the initial data is acquired and a center coordinate of the reference pattern 16 is obtained, the rotation shaft 1 is rotated at a predetermined angle pitch (e.g., a pitch of 5°), a center coordinate of the angle detection pattern 8 is determined every rotation at the pitch, this center coordinate is compared with the center coordinate of the reference pattern 16, and a deviation is determined. The obtained deviation is associated with a rotation angle and is stored in the storage unit 35.

The rotation shaft 1 is rotated by 360°, and a deviation of in one rotation with respect to the center of the reference pattern 16 is determined. If the rotation center of the rotation shaft 1 completely coincides with the optical axis 7 and there is no runout, a locus of this deviation coincides with the center coordinate of the reference pattern 16 as a dot.

Actually, since the runout occurs with the rotation of the rotation shaft 1, a locus formed by a center axis becomes a circle or an ellipse (which will be referred to as an eccentric circle formed due to the runout hereinafter) in accordance with the rotation. However, this eccentric circle formed due to the runout has the high reproducibility in the mechanism, and a direction and an amount of the runout can be accurately grasped based on the locus of the deviation. Therefore, when the eccentric circle formed due to the runout is detected and a measured angle is corrected, even if the rotation shaft has the runout, the angle measurement can be carried out with the high accuracy.

Moreover, since the reference pattern 16 is fixed and is not displaced due to the rotation of the rotation shaft 1, the center position obtained from the reference pattern 16 is regarded as a specified value, and an amount of runout may be obtained by using a deviation between the specified value and the center of angle detection pattern 8 determined in accordance with each rotation at the pitch.

Additionally, when attachment of each pattern may contain an error, the locus formed by the center axis in accordance with rotation is an eccentric circle formed due to the error, the error can be likewise corrected.

Further, when the locus of the deviation is once acquired and stored as correcting information, a rotation angle of the rotation shaft 1 can be accurately measured. Furthermore, when the runout of the rotation shaft 1 is enlarged further for some reason, determining a difference from the acquired deviation enables easily correcting the runout even though the runout is enlarged. In this case, for example, even when the image sensor 13 is deformed due to a temperature, with the correcting information as a reference, the highly reliable and stable measurement can be carried out.

It will now be explained that a runout is measured with high accuracy. In a case where the runout is measured with high accuracy, the angle detection pattern 8 is equally divided into an even number along the circumferential direction every measurement, and the divided portions are set every 90°, for example. The divided portions are classified into a combination of the divided portions which are 180° different from each other and a combination of the portions which are arranged so as to be orthogonal to the combined divided portions. Each of the combined portions is scanned, and the centers of the portions forming the combinations are determined from the respective average values. Moreover, a half value of a phase difference is acquired from the respective centers. A central coordinate is obtained according to the half value and at the same time, a central coordinate of the reference pattern 16 is obtained, and a deviation between the central coordinate of the angle detection pattern 8 and the central coordinate of the reference pattern 16 is determined.

Since the central coordinate as averaged is used, the illumination unevenness and a quantization error produced due to the pixels of the image sensor 13 can be alleviated, and the highly accurate angle measurement can be performed based on the highly accurate detection of the runout.

It is to be noted that, in the foregoing embodiment, the images of the angle detection pattern 8 and the reference pattern 16 are acquired by the image sensor 13, the rotation angles of the angle detection pattern 8 and the reference pattern 16 are detected from the acquired respective images, the detected rotation angles are compared, and an amount of rotation (a rotation angle of the shaft) and the runout of the rotation shaft 1 are determined. However, a deviation of the reference pattern image and the angle detection pattern image acquired by the image sensor 13 may be determined, and a rotation angle and the runout of the rotation shaft 1 may be measured based on the deviation of both the pattern images.

Figure 9:
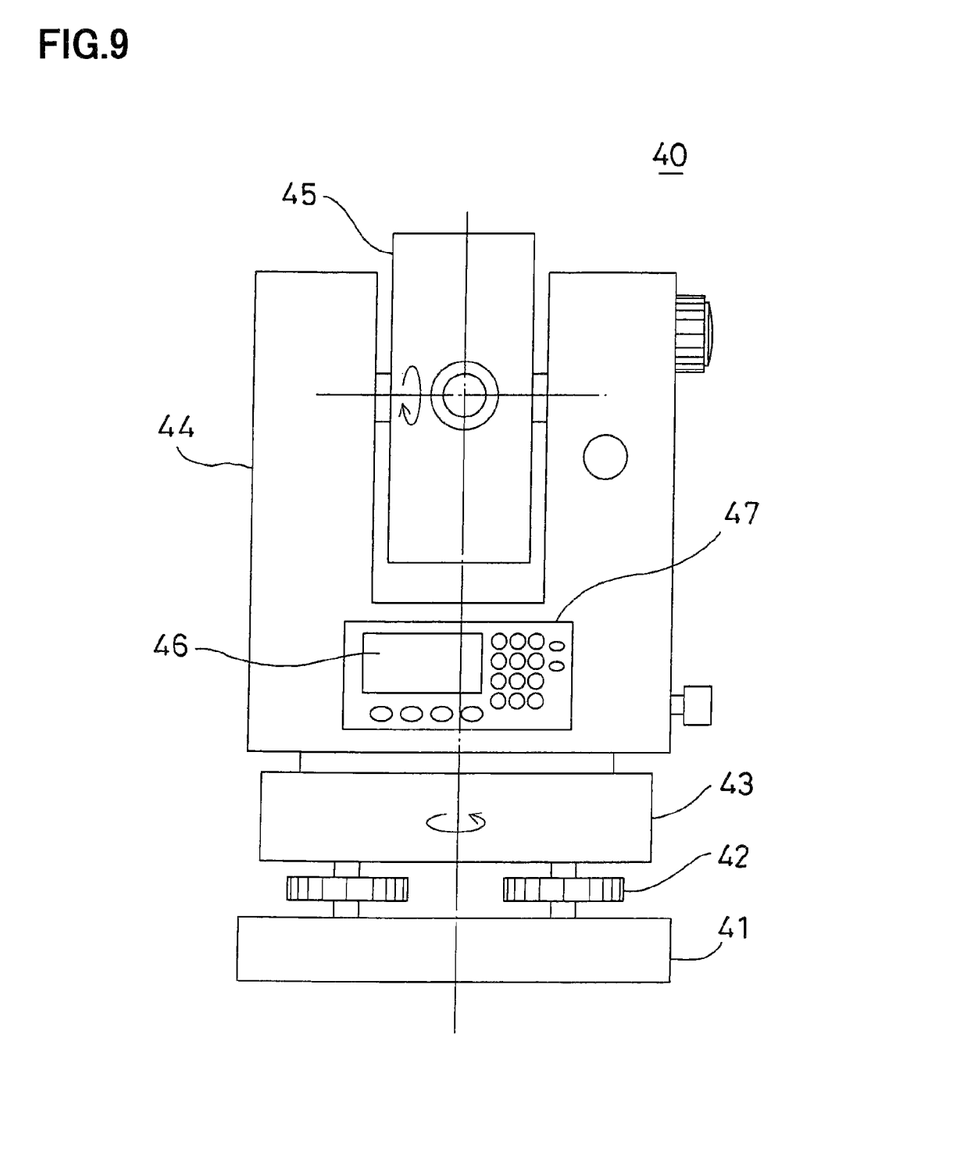
FIG. 9 is a front view showing an example of a surveying instrument using a rotation angle detecting apparatus according to the present embodiment.
Figure 10:
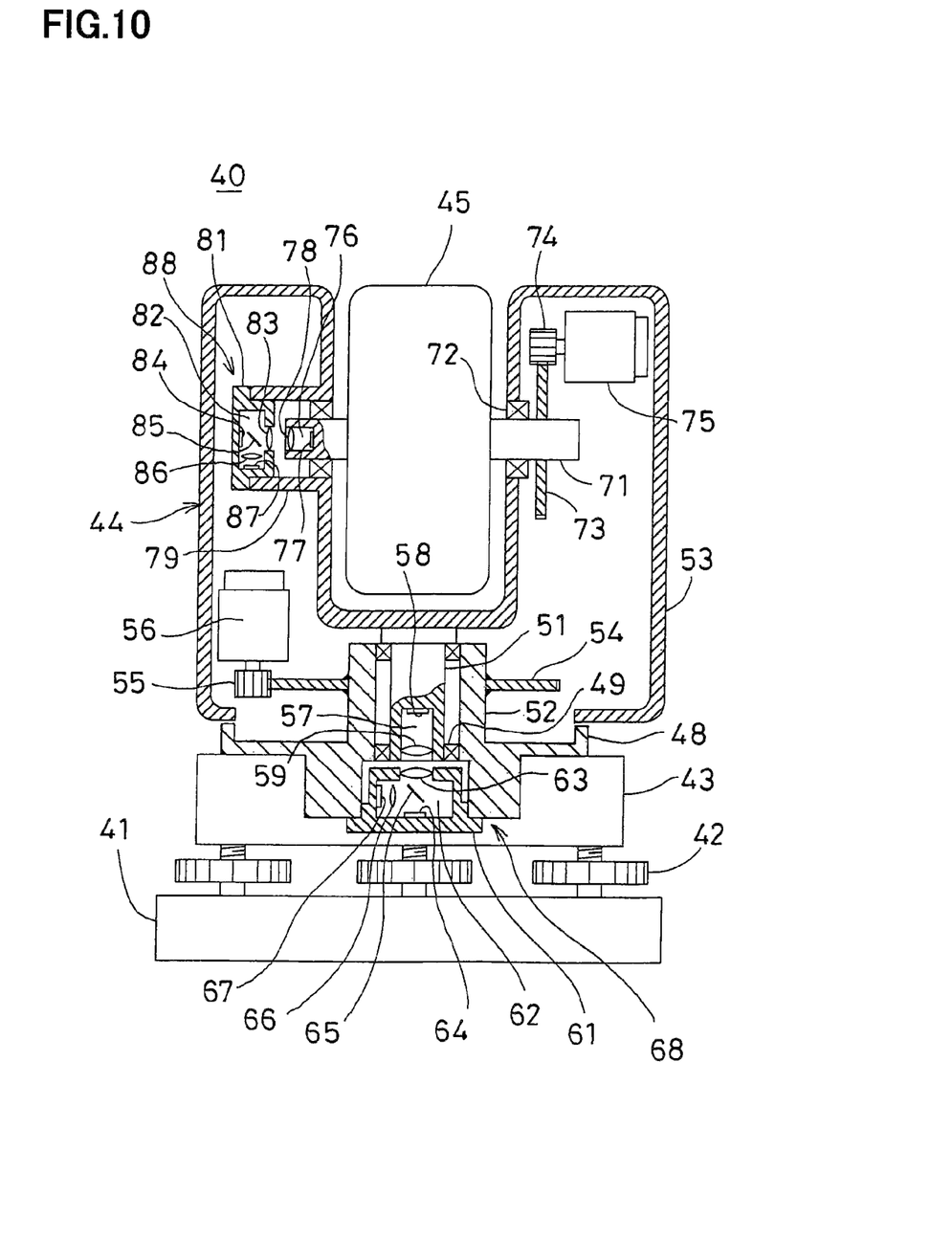
FIG. 10 is a cross-sectional view of the surveying instrument.

FIG. 9 and FIG. 10 show an example where the rotation angle detecting apparatus 18 according to the present embodiment is used for a surveying instrument and also show a total station 40 as an example of the surveying instrument.

A base unit 43 is provided on a leveling unit 41 via leveling screws 42. Amount 44 is provided on the base unit 43, and a telescope unit 45 including an optical system is supported by the mount 44. A distance measuring portion (not shown) is provided in the telescope unit 45. The distance measuring portion is configured to project a distance measuring light to an object to be measured, to receive the distance measuring light reflected by the object to be measured, and to measure the distance based on a reflection light as received.

The base unit 43 can be horizontally leveled by the leveling screws 42. The mount 44 can rotate about a vertical shaft center line, and the telescope unit 45 can rotate about a horizontal shaft centerline. Further, an operation input unit 47 having a display unit 46 is provided on the mount 44, and an operating state of the total station 40 or a measured value of a distance to the object to be measured or the like is displayed on the display unit 46.

A frame base 48 is provided on an upper surface of the base unit 43, and a shaft support 52 protruding upward is provided at the center of the frame base 48. A horizontal rotation shaft 51 is freely rotatably attached and engaged with the shaft support 52 via a bearing 49, and a housing 53 of the mount 44 is fixedly attached to the horizontal rotation shaft 51. The frame base 48 constitutes part of the base unit 43 that supports the housing 53 and also has a function as a lower cover that closes a lower opening of the housing 53.

A horizontal rotary gear 54 is fixedly attached to the shaft support 52, and a horizontal rotary drive gear 55 is engaged with the horizontal rotary gear 54. The horizontal rotary drive gear 55 is fixedly attached to an output shaft of a horizontal rotary motor 56, and the horizontal rotary drive gear 55 is rotated by the horizontal rotary motor 56, and the housing 53 rotates with the horizontal rotation shaft 51 as a center in the horizontal direction via the horizontal rotary gear 54. The horizontal rotary motor 56 is fixedly attached to the housing 53, and the horizontal rotary motor 56 and the housing 53 are integrally rotated.

A lower end portion of the horizontal rotation shaft 51 is hollow, and the hollow portion forms a first shaft portion space 57. A horizontal angle detection pattern 58 and a horizontal first condenser lens 59 are accommodated in the first shaft portion space 57, and the horizontal angle detection pattern 58 and the horizontal first condenser lens 59 are provided on the center line of the horizontal rotation shaft 51.

A shaft portion holder 61 is provided on a lower surface of a central portion of the frame base 48, and the center line of the shaft portion holder 61 coincides with the center line of the horizontal rotation shaft 51. A bearing holder space 62 is formed inside the shaft portion holder 61, a horizontal second condenser lens 63 and a horizontal image sensor 64 are accommodated in the bearing holder space 62, and the horizontal second condenser lens 63 and the horizontal image sensor 64 are provided on the center line of the shaft portion holder 61.

Furthermore, a horizontal half mirror 65 is provided between the horizontal second condenser lens 63 and the horizontal image sensor 64 on the center line of the shaft portion holder 61, and a horizontal third condenser lens 66 and a horizontal reference pattern 67 are provided on a reflection optical axis of the horizontal half mirror 65.

The horizontal angle detection pattern 58, the horizontal first condenser lens 59, the horizontal second condenser lens 63, the horizontal image sensor 64, the horizontal half mirror 65, the horizontal third condenser lens 66, and the horizontal reference pattern 67 constitute a primary part of a horizontal rotation angle detecting apparatus 68 that detects a horizontal angle.

Furthermore, the horizontal first condenser lens 59, the horizontal second condenser lens 63, the horizontal half mirror 65, and the horizontal third condenser lens 66 constitute a horizontal rotation angle detection optical system which forms the projection images of the horizontal angle detection pattern 58 and the horizontal reference pattern 67 on the horizontal image sensor 64.

A vertical rotation shaft 71, which extends from both left and right ends in the horizontal direction, is provided to the telescope unit 45, the vertical rotation shaft 71 is supported by the housing 53 via a bearing 72, and the telescope unit 45 can rotate with the vertical rotation shaft 71 as a center in the vertical direction.

A vertical rotary gear 73 is fixedly attached to one end of the vertical rotation shaft 71, and a vertical rotary drive gear 74 is engaged with the vertical rotary gear 73. The vertical rotary drive gear 74 is fixedly attached to an output shaft of a vertical rotary motor 75. When the vertical rotary motor 75 is driven, the telescope unit 45 is rotated with the vertical rotation shaft 71 as a center via the vertical rotary drive gear 74 and the vertical rotary gear 73.

A second shaft portion space 76 that is concentric with the vertical rotation shaft 71 is formed at the other end portion of the vertical rotation shaft 71, a vertical angle detection pattern 77 and a vertical first condenser lens 78 are accommodated in the second shaft portion space 76, and the vertical angle detection pattern 77 and the vertical first condenser lens 78 are provided on the center line of the vertical rotation shaft 71.

A cylindrical holder support 79 is protruded toward the inside of the housing 53 so as to be concentric with the other end portion of the vertical rotation shaft 71, and a shaft portion holder 81 is fitted on an end portion of the holder support 79. A bearing holder space 82 that is concentric with the centerline of the vertical rotation shaft 71 is formed in the shaft portion holder 81, and a vertical second condenser lens 83 and a vertical image sensor 84 are accommodated in the bearing holder space 82. The vertical second condenser lens 83 and the vertical image sensor 84 are provided on the centerline of the vertical rotation shaft 71.

A vertical half mirror 85 is provided on the center line of the vertical rotation shaft 71 between the vertical second condenser lens 83 and the vertical image sensor 84, and a vertical third condenser lens 86 and a vertical reference pattern 87 are provided on a reflection optical axis of the vertical half mirror 85.

The vertical angle detection pattern 77, the vertical first condenser lens 78, the vertical second condenser lens 83, the vertical image sensor 84, the vertical half mirror 85, the vertical third condenser lens 86, and the vertical reference pattern 87 constitute a primary part of a vertical rotation angle detecting apparatus 88 that detects a vertical angle (an elevation angle).

Further, the vertical first condenser lens 78, the vertical second condenser lens 83, the vertical half mirror 85, and the vertical third condenser lens 86 constitute a vertical rotation angle detection optical system that forms projection images of the vertical angle detection pattern 77 and the vertical reference pattern 87 on the vertical image sensor 84.

An operation of the total station 40 will now be described. Since the functions of the horizontal rotation angle detecting apparatus 68 and the vertical rotation angle detecting apparatus 88 are the same as the function of the rotation angle detecting apparatus 18, a description thereof will be omitted.

First, the leveling screws 42 level the total station 40. After the leveling, the total station 40 is set as a reference position.

Then, to make the telescope unit 45 perform sighting with respect to the object to be measured, the horizontal rotation motor 56 is driven, and the housing 53 is rotated in the horizontal direction. A horizontal rotation angle of the housing 53 is detected by the horizontal rotation angle detecting apparatus 68. Further, a shaft deviation of the rotation shaft (a tilt of the shaft) is also detected by the horizontal rotation angle detecting apparatus 68, and the horizontal angle as detected is corrected based on the shaft deviation as detected.

Furthermore, the vertical rotary motor 75 is driven, and the telescope unit 45 is rotated in the vertical direction. A vertical rotation angle of the telescope unit 45 is detected by the vertical rotation angle detecting apparatus 88, and the shaft deviation of the vertical rotation shaft 71 is also detected by the vertical rotation angle detecting apparatus 88 at the same time. Likewise, based on the shaft deviation as detected, the detected vertical angle is corrected.

When a sighting of the telescope unit 45 is completed, the distance measuring light is emitted from the telescope unit 45, a distance to the object to be measured is measured and, at the same time, a horizontal angle and an elevation angle are measured by the horizontal rotation angle detecting apparatus 68 and the vertical rotation angle detecting apparatus 88.

In the surveying instrument according to the present embodiment, since a horizontal angle and an elevation angle can be highly accurately measured without using an expensive encoder and the horizontal rotation angle detecting apparatus 68 and the vertical rotation angle detecting apparatus 88 do not require the fabrication accuracy, the manufacture can be carried out at a low cost, and a fabrication cost of the surveying instrument can be reduced.

The invention claimed is:

1. A rotation angle detecting apparatus, comprising a bearing holder, a rotation shaft rotatably supported by said bearing holder, a shaft portion space formed in said rotation shaft, a bearing holder space formed in said bearing holder, a first optical axis set in said bearing holder space, a second optical axis which is set in said shaft portion space and provided concentrically with a center line of said rotation shaft and coincides with said first optical axis, a half mirror provided on said first optical axis, an image sensor accommodated in said bearing holder space and provided on said first optical axis, an angle detection pattern accommodated in said shaft portion space and provided on said second optical axis, a reference pattern accommodated in said bearing holder space and provided on an optical axis as branched by said half mirror, an optical system which is provided on and exists across said shaft portion space and said bearing holder space and forms a projection image of said angle detection pattern and a projection image of said reference pattern on said image sensor, a photodetection switching means for selectively projecting said projection image of said angle detection pattern and said projection image of said reference pattern onto said image sensor, and an arithmetic device for calculating a rotation angle of said rotation shaft based on a signal from said image sensor, wherein said arithmetic device detects said rotation angle of said rotation shaft based on a deviation between a signal from said image sensor which has received said reference pattern and a signal from said image sensor which has received said angle detection pattern.

2. The rotation angle detecting apparatus according to claim 1, wherein said arithmetic device acquires from said image sensor said signal which has received said reference pattern and said signal which has received said angle detection pattern every time the measurement is carried out.

3. The rotation angle detecting apparatus according to claim 1 or claim 2, wherein said arithmetic device detects a runout of said rotation shaft based on a deviation between said signal from said image sensor which has received said reference pattern and said signal from said image sensor which has received said angle detection pattern.

4. The rotation angle detecting apparatus according to claim 1 or claim 2, wherein each of said angle detection pattern and said reference pattern has a line-segment pattern in which line segments extending in a radial direction are arranged on a total circumference at a predetermined angle pitch and which has a ring-like track constituted of said line segments.

5. The rotation angle detecting apparatus according to claim 1, wherein each of said angle detection pattern and said reference pattern has a centering pattern indicating a center position.

6. The rotation angle detecting apparatus according to claim 1, wherein said arithmetic device has a storage unit for storing said signals from said image sensor, and said arithmetic device sets at least one first scan line which is a concentric circle on said line-segment pattern of each of a stored angle detection pattern image and a stored reference pattern image, sets a second scan line which is a concentric circle on a reference designation pattern of each of said angle detection pattern image and said reference pattern image, determines deviations of said angel detection pattern image and said reference pattern image based on a signal obtained by scanning said scan line and based on a signal obtained by scanning said reference designation pattern, and detects a rotation angle of said rotation shaft based on both said deviations.

7. The rotation angle detecting apparatus according to claim 6, wherein a rotation angle between said angle detection pattern image and said reference pattern image is calculated based on the number of said line segments which are present between said reference designation patterns of said two images and based on a phase difference between said line segments of said two images.

8. The rotation angle detecting apparatus according to claim 7, wherein said phase difference is an average of the phase differences determined in regard to a necessary number of line segments.

9. The rotation angle detecting apparatus according to claim 1, wherein said arithmetic device sets divided portions at least every 90° in said angle detection pattern along a circumferential direction, classifies said divided portions into a set of two divided portions which are different by 180° and another set of divided portions which is orthogonal to said set, and determines a center of the one set of the divided portions from a value which is a half of a phase difference acquired by scanning the other set of the divided portions.

10. The rotation angle detecting apparatus according to claim 9, wherein said arithmetic device, in a case where said rotation shaft is rotated at a predetermined angle pitch, determines a pattern center every rotation at the predetermined angle by using said angle detection pattern, further, determines a deviation between said pattern center and a center of said reference pattern, acquires an eccentric circle obtained from a locus of said deviation of said pattern centers, and measures a runout at a time of the angle measurement based on a deviation between said eccentric circle and said center obtained from said angle detection pattern.

11. The rotation angle detecting apparatus according to claim 9, wherein said arithmetic device, in a case where said rotation shaft is rotated at a predetermined angle pitch, determines both pattern centers every rotation at the predetermined angle by said angle detection pattern and said reference pattern, further determines a deviation between both the pattern centers, acquires an eccentric circle obtained from a locus of said deviation between both said pattern centers, and measures a runout at a time of the angle measurement based on a deviation of a difference between the said center obtained from said angle detection pattern and said center obtained from said reference pattern in accordance with each measurement from said eccentric circle.

12. A surveying instrument comprising, a base portion, a mount rotatably provided on said base portion via a first rotation shaft having a vertical shaft center line, a telescope unit rotatably provided on said mount via a second rotation shaft having a horizontal shaft center line, a first rotation angle detecting apparatus which is provided between said first rotation shaft and said base and has a configuration according to claim 1, and a second rotation angle detecting apparatus which is provided between a second rotation shaft and said mount and has a configuration according to claim 1.

13. The rotation angle detecting apparatus according to claim 3, wherein each of said angle detection pattern and said reference pattern has a line-segment pattern in which line segments extending in a radial direction are arranged on a total circumference at a predetermined angle pitch and which has a ring-like track constituted of said line segments.

* * * * *